(12) United States Patent
Raidt et al.

(10) Patent No.: US 9,745,737 B2
(45) Date of Patent: Aug. 29, 2017

(54) INSULATED BUILDING STRUCTURE

(71) Applicant: Ewald Dörken AG, Herdecke (DE)

(72) Inventors: Heinz-Peter Raidt, Dortmund (DE); Gilles Schwaab, Dortmund (DE); Nicole Höfer, Witten (DE); Jörn Schröer, Herdecke (DE)

(73) Assignee: Ewald Dörken AG, Herdecke (DE)

( * ) Notice: Subject to any disclaimer, the term of this patent is extended or adjusted under 35 U.S.C. 154(b) by 0 days.

(21) Appl. No.: 15/234,641

(22) PCT Filed: Feb. 10, 2015

(86) PCT No.: PCT/EP2015/000280
§ 371 (c)(1),
(2) Date: Aug. 11, 2016

(87) PCT Pub. No.: WO2015/120974
PCT Pub. Date: Aug. 20, 2015

(65) Prior Publication Data
US 2016/0369493 A1  Dec. 22, 2016

(30) Foreign Application Priority Data

Feb. 13, 2014  (DE) .................. 10 2014 001 874
Jun. 16, 2014  (DE) .................. 10 2014 008 531

(51) Int. Cl.
*E04B 1/64* (2006.01)
*B32B 27/12* (2006.01)
(Continued)

(52) U.S. Cl.
CPC ............... *E04B 1/64* (2013.01); *B32B 27/12* (2013.01); *B32B 27/306* (2013.01); *B32B 27/34* (2013.01);
(Continued)

(58) Field of Classification Search
CPC ............ B32B 27/34; E04C 2/46; E04B 1/665
See application file for complete search history.

(56) References Cited

U.S. PATENT DOCUMENTS 5,953,883 A * 9/1999 Ojala .................. E04B 1/26
  52/220.1
6,481,172 B1 * 11/2002 Porter .................. B32B 5/18
  428/317.7
(Continued)

FOREIGN PATENT DOCUMENTS

DE       29700987      4/1997
DE    202005016200   12/2005
(Continued)

OTHER PUBLICATIONS

International Search Report, PCT/EP2015/000280, date of mailing Jun. 10, 2015.
(Continued)

*Primary Examiner* — Paola Agudelo
(74) *Attorney, Agent, or Firm* — Andrus Intellectual Property Law, LLP

(57) ABSTRACT

An insulated building structure, in particular an insulated roof structure or a wall structure of a building, comprises at least one thermal insulation layer. At least one moisture-variable protective layer for the thermal insulation layer is provided on an outer side of the thermal insulation layer and on an inner side of the thermal insulation layer facing a building interior of the building. The protective layers each have a water vapor diffusion equivalent air layer thickness $S_d$. The water vapor diffusion equivalent air layer thicknesses $S_d$ of the two protective layers deviate from each other by less than 20%, preferably less than 10%, in the range of a relative humidity from 0% to 25% and/or in the range of a relative humidity from 80% to 100%.

23 Claims, 2 Drawing Sheets

(51) Int. Cl.
| | |
|---|---|
| *B32B 27/30* | (2006.01) |
| *B32B 27/34* | (2006.01) |
| *B32B 27/40* | (2006.01) |
| *D06N 3/14* | (2006.01) |
| *E04B 1/62* | (2006.01) |
| *E04B 1/76* | (2006.01) |
| *E04D 12/00* | (2006.01) |
| *D06N 3/00* | (2006.01) |
| *E04D 1/28* | (2006.01) |
| *E04F 13/08* | (2006.01) |
| *C08J 5/18* | (2006.01) |

(52) U.S. Cl.
CPC ............ *B32B 27/40* (2013.01); *D06N 3/0011* (2013.01); *D06N 3/0063* (2013.01); *D06N 3/14* (2013.01); *E04B 1/625* (2013.01); *E04B 1/762* (2013.01); *E04B 1/7645* (2013.01); *E04D 1/28* (2013.01); *E04D 12/002* (2013.01); *E04F 13/0864* (2013.01); *E04F 13/0866* (2013.01); *E04F 13/0875* (2013.01); *B32B 2262/101* (2013.01); *B32B 2307/304* (2013.01); *B32B 2307/724* (2013.01); *B32B 2307/7265* (2013.01); *B32B 2419/06* (2013.01); *B32B 2607/00* (2013.01); *C08J 5/18* (2013.01); *D06N 2205/103* (2013.01); *D06N 2211/06* (2013.01)

(56) References Cited

U.S. PATENT DOCUMENTS

| | | | | |
|---|---|---|---|---|
| 6,599,621 | B2* | 7/2003 | Porter .................. | B32B 5/18 428/107 |
| 8,844,230 | B2* | 9/2014 | Harkins ................ | E04B 1/74 52/404.1 |
| 8,863,458 | B2* | 10/2014 | Noonan ............... | E04B 1/7604 52/407.3 |
| 9,493,938 | B2* | 11/2016 | Schiffmann .......... | E02D 27/013 |
| 2004/0245391 | A1* | 12/2004 | Kunzel ................ | B64C 1/40 244/119 |
| 2006/0019568 | A1* | 1/2006 | Toas ..................... | E04B 1/80 442/381 |
| 2006/0269734 | A1* | 11/2006 | Krajewski ............ | B29C 67/202 428/304.4 |
| 2011/0197530 | A1* | 8/2011 | Bahnmiller ........... | B32B 5/14 52/309.4 |
| 2013/0318911 | A1* | 12/2013 | Sealock ............... | E04F 13/08 52/747.1 |
| 2015/0354205 | A1* | 12/2015 | Sieber ................. | B32B 27/02 52/309.1 |
| 2016/0160503 | A1* | 6/2016 | Beals .................. | E04C 2/46 52/408 |
| 2016/0369493 | A1* | 12/2016 | Raidt .................. | E04B 1/64 |

FOREIGN PATENT DOCUMENTS

| | | |
|---|---|---|
| DE | 102006009260 | 8/2007 |
| DE | 102010054110 | 6/2011 |
| EP | 1824902 | 8/2007 |
| FR | 2987380 | 8/2013 |
| FR | 2997649 | 5/2014 |
| WO | 96/33321 | 10/1996 |
| WO | 02/070251 | 9/2002 |
| WO | 2006/002440 | 1/2006 |
| WO | 2007/146391 | 12/2007 |
| WO | 2011/069672 | 6/2011 |

OTHER PUBLICATIONS

International Written Opinion, PCT/EP2015/000280, date of mailing Jun. 10, 2015.
International Search Report, PCT/EP2015/000279, date of mailing Jun. 10, 2015.
International Written Opinion, PCT/EP2015/000279, date of mailing Jun. 10, 2015.

* cited by examiner

INSULATED BUILDING STRUCTURE

CROSS-REFERENCE TO RELATED APPLICATIONS

This application is the U.S. national stage application of International Application PCT/EP2015/000280, filed Feb. 10, 2014, which international application was published on Aug. 20, 2015, as International Publication WO 2015/120974 in the English language. The International Application claims priority of German Patent Application No. 10 2014 001 874.1, filed Feb. 13, 2014 and German Patent Application No. 10 2014 008 531.7, filed Jun. 16, 2016. The international application and German applications are incorporated herein by reference, in entirety.

FIELD

The present invention relates to an insulated building structure, in particular an insulated roof and/or wall structure of a building, having at least one thermal insulation layer, for example made of glass or mineral wool, wherein there is provided at least one moisture-variable protective layer for the thermal insulation layer on an outer side of the thermal insulation layer, particularly following after a building roof made of roof tiles or shingles, or another roofing material, or following after a facade sheathing of stone, wood, or another facade material of a rear-ventilated facade, and also at least one on an inner side of the thermal insulation layer which faces an interior of the building, particularly arranged in front of a cladding following thereafter, formed by gypsum plasterboard or the like, wherein the protective layers each have a water vapor diffusion equivalent air layer thickness $S_d$ which depends on the ambient moisture.

BACKGROUND

To reduce energy loss through roofs and walls, insulating materials have been mounted in the open spaces in the support structure for a long time. The insulation materials are frequently mineral or natural fiber mats open to diffusion. Early on it was recognized that a protective layer needs to be attached to the boundary surface of the insulated structure which faces the interior. The reason for this is the water vapor transport processes which are triggered, inter alia, by vapor pressure differences between the air in the room and the air on the outer side. If this transport stream is not slowed down, there is a risk of condensation forming on the inner side of the roof and/or wall structure in the cold season. Condensation can occur whenever an unretarded diffusion or convection flow encounters cold component layers, because air can hold less and less water with decreasing temperature. In the worst case, the air present in the cross-section of the building component can become oversaturated, such that significant amounts of excess water are removed from the air as condensation.

In central and northern Europe, the condensation risk occurs mainly in winter, when there is high vapor pressure indoors and low vapor pressure in the air outdoors. For this reason, an attempt is made to block the diffusion current at the side facing into the room, i.e., the warm side of the structure—in order to block the access of the moist air to the structure, which, in the form of rafters or support structures, has a function which affects safety.

Bituminous paper and aluminum coated papers are known from the prior art, and are termed "vapor barriers." Today, plastic films are predominantly used.

In diffusion-inhibiting films known from the prior art, the diffusion resistance $S_d$ values reach approximately from 2 m up to 150 m, and for aluminum films even up to >1500 m, which corresponds to vapor impermeability within the physical context of buildings. The higher the $S_d$ value is, the greater the diffusion resistance. The most commonly used, however, are films with $S_d$ values around 100 m.

In addition to films, OSB boards or gypsum plasterboard panels are used as airtight layers and diffusion-inhibiting layers on the inner side. Their $S_d$ values, however, are very low, so they often cannot sufficiently oppose the diffusion current.

In central Europe, diffusion-inhibiting materials are used on interior sides, whereas materials which are open to diffusion are more commonly used on the exterior sides to allow moisture which can occur in the cross-section of building components to diffuse outward.

All materials listed above have a largely constant $S_d$ value which depends only on the water vapor diffusion resistance value as a characteristic value of the material, and the layer thickness of the material. The water vapor diffusion equivalent air layer thickness in this case is little influenced by ambient conditions such as temperature or humidity.

Vapor retarders are known from the prior art, the resistance of which to water vapor diffusion depends on the moisture content of the ambient air. The advantage of such vapor retarders is that they allow an accelerated drying of a structure if water has penetrated into the structure, because they are more open to diffusion at high moisture contents, and therefore it is possible for moisture to escape. When the moisture content of the air is low, for example in winter, if a water vapor diffusion current moves from the inner side toward the outer side, these vapor retarders have higher $S_d$ values and inhibit the diffusion of water vapor.

A moisture-variable film with a resistance to water vapor diffusion which is moisture-dependent is described, for example, in WO 96/33321 A1. The $S_d$ values of the known film vary from 2 m to 5 m at 30% to 50% relative humidity, up to <1 m at 60% to 80% relative humidity. The film described is designed for use in the central and northern European climate on the interior side.

In climates with warm winters and hot, humid summers, the diffusion current, however, is reversed. In this case, higher vapor pressures occur in the outside air than in the interior. This is particularly the case if the air indoors is conditioned. There is a risk of condensation forming in this case as well. For this reason, diffusion-inhibiting layers are installed on the outer surface of an insulated building structure in hot, humid climates. Climates that have both hot and humid summers and cold winters and, for example, are found at high altitudes in various tropical and subtropical countries, are particularly critical in this case. It is necessary to use combinations of protective layers customized to the local climate, such as vapor retarders with webs for roofs and/or facades.

If protective layers which are designed for use in climatic conditions in temperate climates are used in other climates, dew may form, and in the worst case the structure may fail. To prevent this, different protective layers must be used in practice on the outer side and inner side, and these must be customized to the climatic conditions. If the incorrect protective layers are used, or if no protective layers are used, this can contribute to a reduction in the useful life of the building, and to an increase in energy consumption. This is discussed below.

Hygrothermal simulations can be used to assess the moisture resistance of insulated building structures, and can be carried out, for example, using the WUFI® 5.2 method developed by the Fraunhofer Institute for Building Physics for calculating the transient heat and moisture transport in components. The WUFI® 5.2 program offers the possibility of, among other things, selecting and specifically determining different climates, material data, orientations of buildings and more.

A typical steep roof structure 1 is shown schematically in FIG. 1, and has the structure detailed below, beginning with the outer roof cladding:

| Layer/Material (from outer side to inner side) | Thickness [m] |
|---|---|
| Roof tile (2) | 0.01 |
| Air layer (3) | 0.025 |
| Protective layer, outer side (4) | 0.001 |
| Glass wool layers (5a-c) | 0.140 |
| Protective layer, inner side (6) | 0.001 |
| Air layer (7) | 0.025 |
| Gypsum plasterboard (8) | 0.0125 |

FIG. 2 schematically shows the layer structure of the roof structure 1 described above. The following refers to FIG. 2.

Hygrothermal simulations were created using the WUFI® 5.2 Pro program for the steep roof structure 1, and the moisture resistance of the steep roof structure was evaluated. The complexity of the results attainable with this simulation program made it necessary to define specific evaluation criteria for the given application. As part of the invention, the moisture content of the thermal insulation adjacent to a non-absorbent boundary surface and/or protective layer, such as a vapor retarder or roof membrane, has been taken into account as a decisive factor. For this purpose, the glass wool insulation (glass wool layers 5a-5c) with a total insulation thickness of 140 mm was divided by calculation, such that very thin layers of 1 mm at the boundary surfaces with the vapor retarders 4, 6 were considered separately.

Starting from the premise that the $S_d$ value of the protective layer 4 (outer side) is 0.10 m and the $S_d$ value of the protective layer 6 (inner side) is 20 m, a moisture content of not more than 8 g/m² at the inner glass wool layer 5c, and on the outer glass wool layer 5a a maximum moisture amount of 16 g/m² was determined in the simulation calculations that were performed for the climate region "Holzkirchen/Germany" under constant, unfavorable conditions (orientation: north; pitch: 38°; outer roof surface; radiation absorption from red roof tile; inner thermal resistance: roof; initial conditions: 0.8% relative initial moisture, averaged over the component; during the period from 1 Aug. 2009 until 1 Aug. 2013; two hour calculation intervals (reduced if there are convergence problems). Practical knowledge is available for the DIN-standard-compliant construction of the pitched roof structure 1, which proves that no damage occurs with the above-mentioned amounts of moisture, and therefore support the assessment that these maximum moisture contents are harmless. If protective layers with these $S_d$ value combinations, which are very well suited for the climatic conditions in the temperate climate, are nonetheless used in other climates, harmful condensation can occur, leading to, at worst, the failure of the structure. For example, proceeding from condensation simulations for the climate region "Miami/USA" (very hot and humid outdoors), for the same construction of the pitched roof structure 1, the result is a maximum amount of moisture on the inner glass wool layer 5c of 565 g/m² and on the outer glass wool layer 5a a maximum amount of moisture of 11 g/m², which according to DIN 4108 is considered harmful in terms of structural physics. However, if the outer protective layer 4 and the inner protective layer 6 are replaced by each other, the results for the climate region "Miami/USA" are harmless maximum moisture contents in the glass wool layers 5a, 5c, of 5 g/m² on the inner side and 4 g/m² on the outer side.

This fact has to-date been borne out in building practice by the need to use different vapor retarders customized to the conditions on the outer side and the inner side. If improperly designed and/or if no vapor retarders are used, this contributes to the fact that the useful life of the building will be reduced and more energy consumption is to be expected.

However, if moisture-variable vapor retarders in the previously considered steep roof structure 1 (FIG. 1) are used, the following moisture values in the boundary layers of the protective layers 4, 6 are found by hygrothermal simulations as described above:

| Climate region | Sd value [m] protective layer 6 (inner side) | Sd value [m] protective layer 4 (outer side) | Amount of water glass wool layer 5c (inner side) in [g/m²] | Amount of water glass wool layer 5a (outer side) in [g/m²] |
|---|---|---|---|---|
| Holzkirchen | Variable | 0.1 | 5 | 25 |
| Holzkirchen | 20 | Variable | 8 | 20 |
| Holzkirchen | 0.1 | Variable | 2 | 762 |
| Miami | Variable | 0.1 | 15 | 7 |
| Miami | 20 | Variable | 288 | 23 |
| Miami | 0.1 | Variable | 4 | 5 |

The use of a protective layer 6 (inner side) with a variable $S_d$ value, and a protective layer 4 (outer side) with an $S_d$ value of 0.1 for the climate region "Holzkirchen/Germany" leads to slightly elevated but acceptable moisture contents in the outer glass wool layer 5a, which is adjacent to the outer protective layer 4, constructed as a weather protection web. The use of the same protective layer 4, 6 for the climate region "Miami/USA" results in increased but acceptable moisture contents on the inner side. In contrast, if a protective layer 6 (inner side) with an $S_d$ value of 20 m, and a protective layer 4 (outer side) with a moisture-variable $S_d$ value are used, for the climate region "Miami/USA" the result is not only a very high water content of the inner glass wool layer 5c, but also an increase in the total water content of the construction, which is highly dangerous. The same $S_d$ value combination for climate region "Holzkirchen/Germany," in contrast, results in harmless moisture contents. As such, it is possible, merely with a certain variation/combination of $S_d$ values of materials adjacent to the thermal insulation, to achieve a structure with no damage potential. Conversely, an incorrect material selection and/or incorrect installation situation carries a high risk of damage.

To make matters worse, with increasing industrialization in tropical climates, air conditioners are used, which can exacerbate the problem of condensation. As a result, the amounts of water encountered sometimes are increased by more than double, which can lead to failure of the structure due to moisture accumulation. Accordingly, in the prior art, there is general agreement that different protective layers/materials must be used on the inner side and on the outer side as protection against the weather. No protective layer is known from the prior art which can be used in different climatic regions worldwide. Also, there is no combination known in the prior art of a moisture-variable vapor barrier inside, and a diffusion-open web for roofs and/or facades outside, which can be used worldwide and/or regardless of climate.

SUMMARY

The problem addressed by the present invention is that of providing an insulated building structure of the type named above, having improved properties for the prevention of damage due to moisture to the building materials used in the building structure. In particular, it should be possible to use the building structure in many different climates without a chance of failure of the structure due to moisture accumulation.

The problem is addressed, in an insulated building structure with the features described above, in that the water vapor diffusion equivalent air layer thicknesses $S_d$ of both protective layers differ from each other by less than 20%, preferably less than 10%, in the range of a relative (air) humidity of the atmosphere surrounding the protective layer of 0% to 25% and/or in the range of a relative humidity of the atmosphere surrounding the protective layer of 80% to 100%, preferably from 85% to 100%. The deviation between the $S_d$ values of both protective layers can also be less than 5% in the ranges named above. In the building structure according to the invention, a protective layer is provided both on the outer side and on the inner side of the thermal insulation layer, and the protective layers have a very similar or substantially the same Sd value profile. The thermal insulation layer need not have a homogeneous construction. Also, in the range of a relative humidity of 25% to 50% and/or 50% to 80%, preferably from 50% to 85%, the deviation of the water vapor diffusion equivalent air layer thicknesses $S_d$ of both protective layers can be in the aforementioned ranges. The term "$S_d$ values profile" in this case relates to the dependence of the water vapor diffusion equivalent air layer thickness $S_d$ of the protective layer on the relative moisture of the atmosphere surrounding the protective layer. The building structure according to the invention can be used virtually worldwide and independent of climate, without the likelihood of damage to the structure, or of failure of the structure, due to moisture accumulation.

For the sake of completeness, it should be noted that the $S_d$ value indicates the water vapor diffusion equivalent air layer thickness, which is a measure within the field of building physics for the water vapor diffusion resistance of a component or a component layer. The $S_d$ value is given with the unit [m], and is composed physically as the product of the dimensionless material constant, the water vapor diffusion resistance factor μ of the respective building material, multiplied by the component layer thickness "S" to give the unit [m].

In a preferred embodiment of the invention, protective layers are provided on the outer side and on the inner side of the thermal insulation layer which have a substantially identical water vapor diffusion equivalent air layer thickness Sd, which is dependent on the ambient moisture, in the range of a relative humidity of 0% to 25%, and/or in the range of a relative moisture of 80% to 100%, preferably 85% to 100%. It is also preferred in this context that protective layers with the same design, and/or which are identical, are included on the inner side of the room and the outer side of the thermal insulation layer. This leads to a simple construction of the structure and ensures that the building structure according to the invention can be advantageously used in almost all climates.

The barrier values of the protective layers according to the invention are optimized in such a manner that the protective layers can be used on the outer side and/or inner side of thermal insulation layers, preventing and/or inhibiting the diffusion of water vapor on the inner side, and/or allowing drying in summer on the outer side of the thermal insulation, or vice versa, depending on the climatic conditions. By using accordingly designed protective layers both on the inner side and also as external weather protection, it is possible to build structures for essentially all climates, resulting merely in the formation of harmless amounts of condensation.

The water vapor permeability is tested, and the $S_d$ values are measured, in accordance with DIN EN ISO 12572 and DIN EN 1931, according to the range of humidity. The moisture-adaptive behavior of the material of the protective layer can be influenced by ab- or adsorptive processes, swelling, other physical processes and/or by chemical reactions, and must be reversible.

According to the invention at least one protective layer at least partly consists of a material and/or has a material which at a relative humidity of the atmosphere surrounding the protective layer in the range of up to 25% has a water vapor diffusion equivalent air layer thickness $S_d$ of greater than or equal to 10 m, and/or at a relative humidity of the atmosphere surrounding the protective layer in the range of more than 90% has an $S_d$ value of less than or equal to 0.4 m.

According to the invention, a layer is referred to as moisture-variable if the $S_d$ value of the layer changes with increasing or decreasing moisture of the air surrounding the protective layer in such a manner that, overall, there is a different structural-physical behavior than there would be if the $S_d$ value were constant. This process must be reversible. The change in the structural-physical behavior in this case must be from a more pronounced diffusion-inhibiting to a more pronounced diffusion-open behavior, and vice versa. Basically, the $S_d$ value increases with decreasing moisture, or decreases with increasing moisture, respectively. The $S_d$-value profile as a function of the humidity in this case is non-linear, has at least three curve segments, and contains one or two inflection points. The absolute inflection point, that is, the transition between diffusion-inhibiting and diffusion-open behavior, is between 50 and 90% relative humidity. The $S_d$ value can be between 0.05 m and 150 m over the entire moisture range.

The protective layer according to the invention is preferably characterized in that the $S_d$ value at a relative humidity of 90% is between 0.05 m and 0.4 m, wherein the $S_d$ value is preferably as small as possible. In this case, values of less than 0.1 m, and particularly less than 0.09 m, are preferred.

At a relative humidity of 80%, the $S_d$ value of the protective layer according to the invention is preferably between 0.05 m and 150 m, and in any case is always greater than at a relative humidity of 90%, and less than at a relative humidity of 50%.

At a relative humidity of 65.5%, the $S_d$ value should be between 4 m and 20 m, preferably between 5 m and 15 m, and in any case greater than at a relative humidity of 80% and less than at a relative humidity of 50%.

At a relative humidity of 50%, the $S_d$ value can preferably be between 5 and 150 m, but in any case is always greater than at a relative humidity of 80% and less than at a relative humidity of 25%.

At a relative humidity of 37.5%, the $S_d$ value should be between 20 m and 90 m, in particular between 30 m and 80 m, wherein it is always greater than the $S_d$ value at a relative humidity of 50% and less than at a relative humidity of 25%.

At a relative humidity of 25%, the $S_d$ value of the protective layer according to the invention can be between 10 m and 150 m, and is always greater than at a relative humidity of 50%. Preferably, the $S_d$ value at a relative humidity of 25% is between 40 m and 90 m.

In an alternative embodiment, the $S_d$ values can be even lower at a relative humidity of 25%. The $S_d$ value in this case can be between 10 m and 30 m. Thereafter, the $S_d$ value continuously decreases and is, for example at a relative humidity of 37.5%, between 10 m and 30 m, and in any case is less than at a relative humidity of 25%. At a relative humidity of 65.5%, the $S_d$ value is preferably less than 10 m; at a relative humidity of 80% it is preferably less than 0.1 m. At a relative humidity of 90%, the $S_d$ value is likewise less than 0.1 m, but is also lower than at 80%.

In all embodiments, with increasing relative humidity the $S_d$ value always decreases.

Also, it should be noted that in the aforementioned intervals of $S_d$ values, where the individual values of the relative humidity are given, all intermediate intervals and also all individual values should be considered disclosed and essential to the invention, even if they are not specified in detail.

Also, it should be understood that the $S_d$ value ranges named above for different humidities need not be met cumulatively in all cases by the protective layer according to the invention. All intermediate values of the aforementioned $S_d$ value ranges are hereby considered disclosed.

What is essential is that the protective layer according to the invention, at a relative humidity of the atmosphere surrounding the protective layer in the range of 0% to 25%, has an $S_d$ value of greater than 10 m, and at a relative humidity in the range of 90% to 100% has an $S_d$ value of less than 0.4 m.

The following combinations of $S_d$ value ranges are given as examples for the given humidities according to the invention:

|  | Humidity [%] | | | |
| --- | --- | --- | --- | --- |
|  | 25 | 50 | 80 | 90 |
| $S_d$ value [m] | 10 | 5 | 0.11 | 0.05 |
| $S_d$ value [m] | 10 | 8.8 | 0.051 | 0.05 |
| $S_d$ value [m] | 10 | 9.999 | 9.998 | 0.4 |

In the range of a relative humidity of less than 25%, the $S_d$ value of the protective layer is preferably below the $S_d$ value range which is named above for a relative humidity of 25%. In other words, the $S_d$ value in the range of a relative humidity of less than 25% is more than 10 m, up to more than 150 m.

Comprehensive hygrothermal simulations carried out in the development of the invention, to evaluate the moisture-proofness of insulated building structures, performed using the WUFI® 5.2 method for calculating the transient heat and moisture transport in building components, as well as comprehensive experiments carried out in the development of the invention, have shown that protective layers with the water vapor diffusion characteristics described above have significantly improved properties to prevent damage due to moisture to the materials used in an insulated building structure. In particular, it is possible using the protective layers to develop a design which prevents damage regardless of climatic conditions and enables high drying potential in insulated roof and wall structures. This approach takes into account the basic idea that high $S_d$ values are advantageous at the point of the structure where the entry of moisture can be expected, and low $S_d$ values are advantageous at the point where the moisture should escape. The insulated building structure according to the invention accordingly has at least one suitable moisture-variable protective layer of the type described above, both on an outer side of the thermal insulation layer and on an inner side of the thermal insulation layer facing toward the interior of the building. Further preferably, one protective layer is arranged on the inner side of the structure, and another on the outer side of the structure directly on the thermal insulation layer.

A feature of the protective layer is preferably that the diffusion-inhibiting material can form an airtight layer to conserve energy and protect wood. The airtightness of multiple protective layers in connection with each other can be established using self-adhesive strips, welding, adhesive tapes, or suitable adhesives. Air-tightness is necessary, but only for the protective layer as a whole. In a multilayer structure, it is not necessary for all of the layers to be airtight individually. The protective layer can be bonded to building parts with suitable adhesives and/or Compriband with fixation to battens.

The protective layer according to the invention can be designed as a panel and/or flat structure, in particular as a (flexible) film and/or membrane and/or as a coating of a substrate material, more particularly as a brushed-on and/or sprayed coating of a substrate material, and/or can have such a flat material. The film can be applied as a polymer coating (one or both sides) to a substrate material, or be laminated to a substrate material on one or both sides, wherein the substrate material can particularly be a fabric or a fleece. An adhesive layer can be included to improve the adhesion between the film and the substrate material. In the protective layer according to the invention, the material can also have an adhesive component for improving the adhesion between the film and a substrate material. The protective layer can be equipped with self-adhesive strips or with a full-surface adhesive layer.

The starting materials for the production of the protective layer can be used in the form of plastic granules or dispersions/emulsions and/or powders. The manufacturing process can be based on casting, coagulation, blown film or film extrusion methods. Individual layers can be calendered, laminated, or bonded by means of heat or adhesive layers. Furthermore, dipping, spraying, sputtering, and knife coating are possible for liquid components. A subsequent heat fixation or stretching, or hydrophobization of an intermediate product may be necessary for producing the protective layers.

The protective layer according to the invention preferably has a layer thickness of 10 μm to 3 mm, more preferably from 20 μm to 2 mm, and particularly preferably from 50 μm to 1 mm.

The weight per unit area of the protective layer can be between 20 g/m² and 700 g/m², preferably between 50 g/m² and 270 g/m².

The diffusion-inhibiting material can comprise a polyamide (PA), in particular PA 6, PA 3, and/or a polyamide copolymer, and/or can be a material which can be obtained from, and/or consists of, polyamide, in particular PA 6, PA 3, and/or a polyamide copolymer, as a starting material, optionally with other components.

To achieve the required characteristics with respect to water vapor diffusion resistance, the material can also comprise an ionomer and/or can be obtained from or consist of an ionomer as the starting material, and optionally further components. It is also possible that the material has an ethylene vinyl alcohol homo- or copolymer (EVAL), and/or can be obtained from, or consists of, the same.

A suitable moisture-variable material can also be polyurethane (PU), particularly a thermoplastic polyurethane (TPU). Preferably, a polyurethane which is obtained by a combination and/or reaction of aliphatic or aromatic diisocyanates with polyester-, polyether-, polyetherester-, polycaprolactam- or polycarbonate-diols can be employed. The material can be designed as a film and/or can have a film, the preparation of which is based on polyurethane and/or consists of polyurethane and/or comprises polyurethane. In particular, a film can be used which is made of thermoplastic polyurethane and/or consists of a thermoplastic polyurethane and/or comprises a thermoplastic polyurethane. The moisture-variable material can also be partly or completely made of a thermoplastic polyester elastomer (TPE-E), known under trade names such Keyflex, Hytrel, Arnitel, or the like, or made of thermoplastic polyamide elastomer (TPE-A), known by way of example under the trade name Pebax or the like.

Alternatively, it is also possible that the diffusion-inhibiting material comprises an ethylene vinyl acetate (EVA) as the starting material and/or can be obtained from or consists of an ethylene-vinyl acetate and optionally other components.

To achieve the required characteristics of the protective layer with respect to water vapor diffusion resistance, a film as the protective layer can preferably be obtainable from or consists of a mixture of a polyurethane with a polymer having vinyl alcohol as the monomer portion, and optionally other components, and/or can consist of such a mixture and/or can comprise such a mixture. Such a polymer containing a vinyl alcohol can be, by way of example, a polymer obtainable under the trade name EVAL from the Kuraray company. EVAL resins offer excellent gas barrier properties and can be processed easily and inexpensively using conventional production equipment. Resins according to the invention have a vinyl alcohol content of 52 wt. % to 76 wt. %, preferably from 60 wt. % to 70 wt. %, and more preferably from 65 wt. % to 68 wt. %. It has proven to be expedient if the polyurethane content in the mixture is more than 50 wt. %, in particular more than 60 wt. %, and more particularly more than 75 wt. %, based in each case on the mixture.

It should be understood that the moisture-variable material can also be obtained from a combination and/or reaction of at least two of the aforementioned starting materials. In particular, the material can be a combination of a component with a high barrier value and a component having a low barrier value, also in combination with other components. The $S_d$ values/relative humidity conditions, as well as other properties such as hardness or flexibility, are made specifically adjustable by modifying the weight fractions in this case.

The moisture-variable material can contain active or passive additives and/or fillers. Active additives are understood in the context of the invention as those which affect the moisture variability of the diffusion-inhibiting material by, for example, being able to absorb moisture. For example, the active additive can be a fumed silica, in particular a silica obtainable under the trade name AEROSIL®. Passive fillers, in contrast, within the context of the invention, are those whose properties are moisture independent, such as phyllosilicates for example. Stabilizers or processing aids can be used as further additives.

To further improve or ensure the required characteristics with respect to the water vapor diffusion resistance, a polyurethane and/or an ethylene vinyl alcohol polymer and/or the mixture thereof can have at least one filler as an additive, by way of example, in particular a phyllosilicate, and more specifically a nanophyllosilicate. Phyllosilicates are gas-impermeable plates. They produce a barrier effect against diffusion of gases such as water vapor, because of their orientation in the plastic. Ideally, the nanoclays are oriented in such a manner that they can generate a higher barrier value and thus a higher $S_d$ value than the matrix polymer. If a matrix polymer is used, which can swell at elevated moisture, this can lead to the phyllosilicate platelets orienting in such a manner that accelerated vapor transport at the layer boundaries is made possible by the distances between the layers increasing, thereby achieving a very low $S_d$ value.

A particularly high level of resistance against undesired penetration of moisture into the structure results if a change in the relative humidity of the atmosphere surrounding the protective layer leads to a delayed change in the water vapor diffusion equivalent air layer thickness $S_d$ of the material. If the reaction is delayed, the protective layer is then open and/or has an increased permeability to water vapor if the short-term increase in moisture has already attenuated. This then largely rules out the possibility of an undesired entry of moisture into the insulated building structure. If, in contrast, there is a permanent presence of moisture inside the building and/or the building structure, the moisture can escape as soon as the film is open.

Preferably, the moisture-variable material is designed in such a manner that an increase in the relative humidity, for example from a range between 0% and 25% to a range of 80% to 100%, leads to a lowering of the water vapor diffusion equivalent air layer thickness $S_d$ of the material, for example to an $S_d$ value of less than 5 m, preferably less than 1 m, and more preferably less than 0.1 m, after 2 h to 96 h, in particular after 12 h to 72 h, and more particularly after 24 h to 28 h. Because the lowering of the $S_d$ value occurs with a delay after the increase in moisture, a short-term increase in moisture, as can arise when the building is used, for example as a result of cooking, or even after a rainstorm, does not result in too much water penetrating into the structure. On the other hand, moisture which is present over long periods of time, as can occur in the interior of the structure, can escape.

DETAILED DESCRIPTION

The invention is explained below using examples.

The hygrothermal simulations described below were carried out with the simulation program WUFI® 5.2. The calculations generally proceed from the most unfavorable conditions. The following basic conditions were considered:
- the outer layer covers the entire area (of the roof and/or facade cladding);
- the rear ventilation plane has a moisture storage function and an air and moisture source is assumed;
- the roof pitch is 35°, red roofing tiles are assumed, with rain adhesion corresponding to inclination;
- for facades, wood cladding is assumed;
- the buildings are aligned in the direction of the lowest radiant energy input to simulate the worst case;
- calculations were made in two-hour intervals for Sep. 1, 2013 to Sep. 1, 2018;
- if multiple records were saved in the climate data, the worst case was used;
- an installation plane of 25 mm and a gypsum plasterboard were arranged on the inner side;
- the initial moisture content over the component was set at a constant 80%;
- the indoor climate was calculated depending on the external air according to EN 15026, with high moisture load.

Example 1

Figure 1:
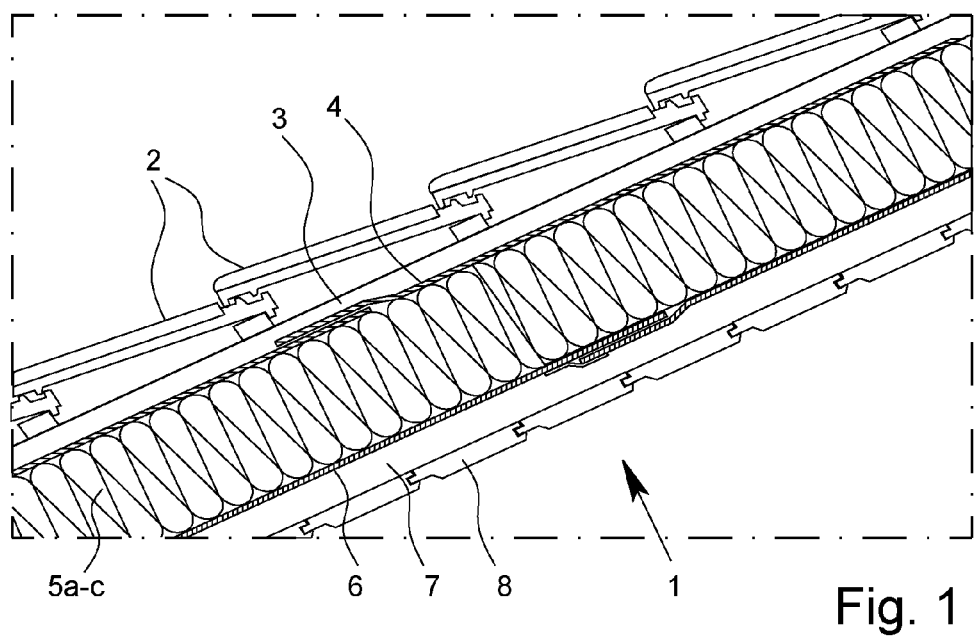
FIG. 1 is a schematic view of an insulated roof structure.
Figure 2:
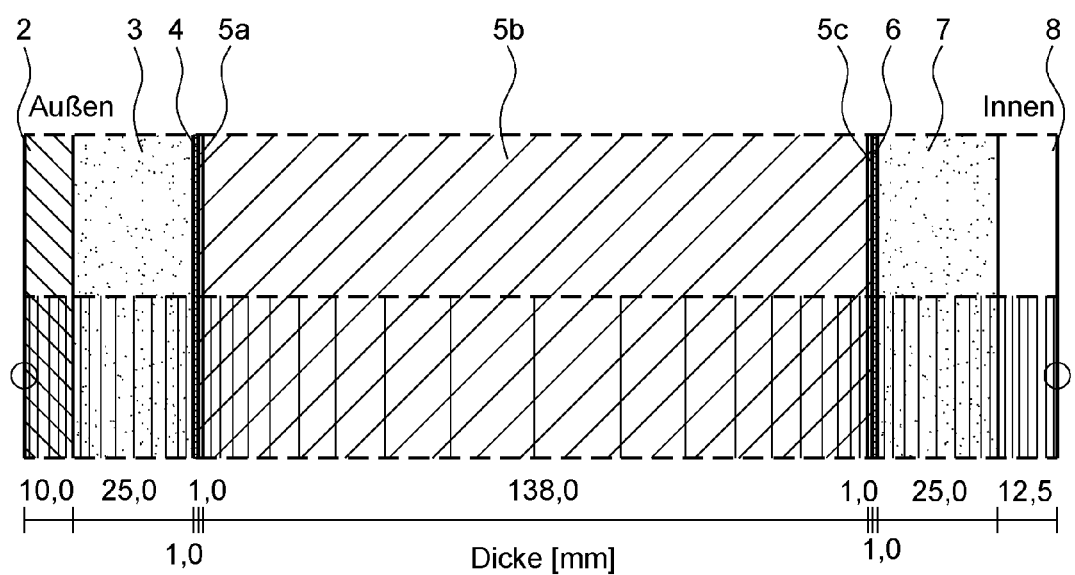
FIG. 2 is a schematic view of a layer structure for the roof structure of FIG. 1.

On the basis of the standard pitched roof structure 1 shown in FIG. 1, with the layer structure and the layer thicknesses shown in FIG. 2, WUFI® 5.2. hygrothermal simulations were performed using the above-mentioned method to calculate the transient heat and moisture transport in components. Different climate zones were considered.

Figure 3:
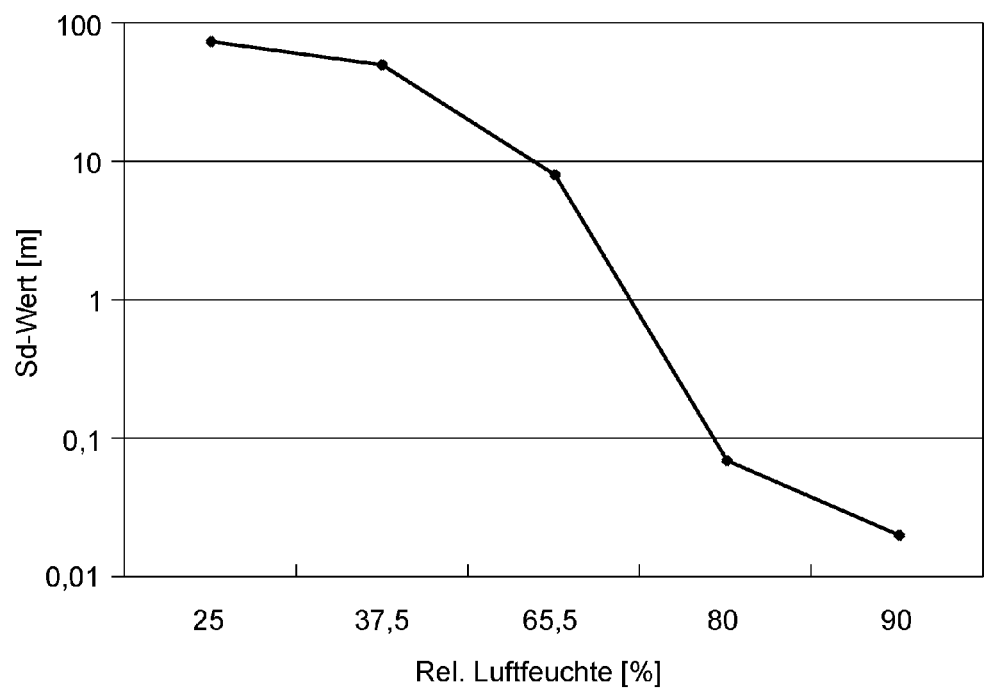
FIG. 3 is a graphical profile of $S_d$ vs. relative humidity for a protective layer of an insulated building structure according to the present disclosure.

However, in the simulation, the assumption was made that the pitched roof structure 1 is protected on the outer side and the inner side, by way of example, with a moisture-variable film and/or membrane as a protective layer 9 (see FIG. 4), which has an $S_d$ value according to the invention of 0.05 m in the moist range at a relative humidity of greater than 80% and more than 20 m in the dry range at a relative humidity of less than 25%. The $S_d$ value profile of the relative humidity of the film which was considered in the simulation is shown schematically in FIG. 3. In addition, an outer glass wool boundary layer 5a and an inner glass wool boundary layer 5c, both adjacent to the protective layers 9 (moisture-variable film) were considered, with a thickness of the glass wool boundary layers 5a, 5c of 1 mm in each case. The simulations carried out led to the following quantities of water in the glass wool boundary layers 5a, 5c:

| | | Average | | Glass wool water content [g/m²] | |
|---|---|---|---|---|---|
| Climate region | Climate type per Neef | Temperature [° C.] | Humidity [%] | Inner side | Outer side |
| Holzkirchen | Transition climate | 6.8 (−20b32) | 81 | 3 | 19 |
| Miami, USA | Moist trade wind climate | 25 (6b34) | 71 | 6 | 8 |
| Malaga, Spain | Winter rain climate of the west sides | 18 (0b40) | 64 | 3 | 9 |
| Karasjok, Norway | (arctic) (sub)polar | −3.1 (−44b24) | 87 | 2 | 15 |
| Tokyo, Japan | Subtropical east-side climate | 16 (−1b35) | 62 | 4 | 8 |
| Christchurch, New Zealand | Oceanic climate of the west sides | 11 (−6b34) | 75 | 3 | 12 |
| Santiago de Chile | | 14 (0b27) | 62 | 2 | 8 |
| Anchorage, Alaska, USA | | 0.8 (−30b24) | 71 | 2 | 15 |
| Honolulu warm | Tropical alternating climate | 25 (16b32) | 65 | 3 | 9 |
| Las Vegas | Dry trade wind climate | 20 (−8b46) | 25 | 3 | 5 |
| Minneapolis | Cool continental climate | 6 (−32b35) | 72 | 4 | 14 |
| San Francisco | Winter rains of the west sides | 14 (2b38) | 71 | 2 | 13 |
| Salt Lake City, USA | High alpine climate | 12 (−13b38) | 61 | 3 | 11 |
| Colorado Springs | Continental warm summer climate | 8 (−25b33) | 57 | 4 | 13 |
| Atlantic City | East side climate | 12 (−21b34) | 71 | 3 | 4 |

For the Earth's climate zones of the greatest diversity, non-critical moisture contents were calculated in the mineral wool layers which are directly adjacent to the protective layers according to the invention, both in hot and humid climates and in very cold climates.

Example 2

The hygrothermal simulation considered a typical structure of a timber framework wall with rear-ventilated facade cladding made of wood. For the simulation, it was assumed that a wood fiber insulating board is included on the outer side of the insulation to stiffen the structure, and the water content was also determined for a thin boundary layer of 1 mm at the boundary layer with the protective layer according to the invention. The exterior cladding is made of wood. The structure was calculated vertically.

The following amounts of water were determined:

|  |  | Average | | Glass wool water content [g/m²] | | Wood fiber insulation panel water content [g/m²] |
| --- | --- | --- | --- | --- | --- | --- |
| Climate region | Climate type per Neef | Temperature [° C.] | Humidity [%] | Inner side | Outer side | Outer side |
| Holzkirchen | Transition climate | 6.8 (−20b32) | 81 | 2 | 1 | 30 |
| Miami, USA | Moist trade wind climate | 25 (6b34) | 71 | 2 | 1 | 27 |
| Malaga, Spain | Winter rain climate of the west sides | 18 (0b40) | 64 | 2 | 1 | 27 |
| Karasjok, Norway | (arctic) (sub)polar | −3.1 (−44b24) | 87 | 1 | 1 | 30 |
| Tokyo, Japan | Subtropical east-side climate | 16 (−1b35) | 62 | 2 | 1 | 27 |
| Christchurch, New Zealand | Oceanic climate of the west sides | 11 (−6b34) | 75 | 2 | 1 | 27 |
| Santiago de Chile |  | 14 (0b27) | 62 | 2 | 1 | 28 |
| Anchorage, Alaska, USA |  | 0.8 (−30b24) | 71 | 1 | 1 | 29 |
| Honolulu warm | Tropical alternating climate | 25 (16b32) | 65 | 2 | 1 | 27 |
| Las Vegas | Dry trade wind climate | 20 (−8b46) | 25 | 2 | 1 | 28 |
| Minneapolis | Cool continental climate | 6 (−32b35) | 72 | 2 | 1 | 32 |
| San Francisco | Winter rains of the west sides | 14 (2b38) | 71 | 2 | 1 | 27 |
| Salt Lake City, USA | High alpine climate | 12 (−13b38) | 61 | 2 | 1 | 28 |
| Colorado Springs | Continental warm summer climate | 8 (−25b33) | 57 | 2 | 1 | 29 |

The amounts of water in the wood fiber insulation vary only insignificantly for the considered climates. They correspond, at a density of 165 kg/m³, to a maximum water content percentage of 18.2 ma. %. These are therefore within the normal range, achieving a safe physical building structure.

Example 3

WUFI® 5.2. hygrothermal simulations were performed using the above-mentioned method to calculate the transient heat and moisture transport in components. Here, a pitched roof structure was considered, with a clamping felt as insulation and moisture source, the construction of which substantially corresponds to the construction of the pitched roof structure in Example 1. In this case as well, the simulation calculations used protective layers 9 with the $S_d$ value profile according to the invention, rather than the vapor retarders 4, 6, in FIG. 1.

In addition, the simulation program took into consideration that moisture sources are arranged beneath the outer protective layer. Therefore, this simulates the case in which the airtight layer has leaks. Otherwise, the simulation proceeded as in Example 1.

|  |  | Average | | Clamping felt water content [g/m²] | |
| --- | --- | --- | --- | --- | --- |
| Climate region | Climate type per Neef | Temperature [° C.] | Humidity [%] | Inner side | Outer side |
| Holzkirchen | Transition climate | 6.8 (−20b32) | 81 | 1 | 19 |
| Miami, USA | Moist trade wind climate | 25 (6b34) | 71 | 3 | 1 |
| Malaga, Spain | Winter rain climate of the west sides | 18 (0b40) | 64 | 1 | 1 |
| Karasjok, Norway | (arctic) (sub)polar | −3.1 (−44b24) | 87 | 1 | 35 |
| Tokyo, Japan | Subtropical east-side climate | 16 (−1b35) | 62 | 1 | 1 |
| Christchurch, New Zealand | Oceanic climate of the west sides | 11 (−6b34) | 75 | 1 | 2 |
| Santiago de Chile |  | 14 (0b27) | 62 | 1 | 1 |
| Anchorage, Alaska, USA |  | 0.8 (−30b24) | 71 | 1 | 1 |
| Honolulu warm | Tropical alternating climate | 25 (16b32) | 65 | 1 | 1 |
| Las Vegas | Dry trade wind climate | 20 (−8b46) | 25 | 1 | 1 |
| Minneapolis | Cool continental climate | 6 (−32b35) | 72 | 2 | 8 |
| San Francisco | Winter rains of the west sides | 14 (2b38) | 71 | 1 | 2 |

-continued

| Climate region | Climate type per Neef | Average Temperature [° C.] | Humidity [%] | Clamping felt water content [g/m²] Inner side | Outer side |
|---|---|---|---|---|---|
| Salt Lake City, USA | High alpine climate | 12 (−13b38) | 61 | 1 | 3 |
| Colorado Springs | Continental warm summer climate | 8 (−25b33) | 57 | 1 | 1 |
| Atlantic City | East side climate | 12 (−21b34) | 71 | 1 | 10 |

Even with modified insulation material, no harmful condensation is to be expected.

The constructions simulated in Examples 1 to 3 can be used substantially independent of climate, and are fully functional.

Possible preparations/formulations for a suitable protective layer are described below, whereby the simulations described above were performed with a protective layer according to recipe 2:

Recipe 1:

A compound consisting of 60 wt. % of an ether-TPU, brand name DESMOPAN, from the Bayer company, and 40 wt. % of an ethylene vinyl alcohol copolymer, brand name EVAL F, from the Kuraray company, was poured into a cast film as a protective layer, with a weight per unit area of 100 g/m².

Recipe 2:

A fleece having a weight per unit area of 70 g/m² was extrusion coated with a compound comprising 65 wt. % of an ether-ester TPU, brand name DESMOPAN, from the Bayer company, and 35 wt. % of an ethylene vinyl alcohol copolymer, brand name EVAL C, from the Kuraray company, with a weight per unit area of 70 g/m².

Recipe 3:

A 41% aqueous polyether polyurethane dispersion from the Alberdingk Boley company was filled with 5 wt. % nanophyllosilicate by means of a ball mill, homogenized and knife-coated onto a PET fleece, having a weight per unit area of 70 g/m², and cross-linked by heat treatment. This produced a film with a weight per unit area of 170 g/m².

All named value ranges include all intermediate values and intervals, even if they are not explicitly expressed. These intermediate values and intervals are considered essential to the invention. Further features, advantages and details of the invention will become apparent from the following description with reference to FIG. 4 of the drawings.

Figure 4:
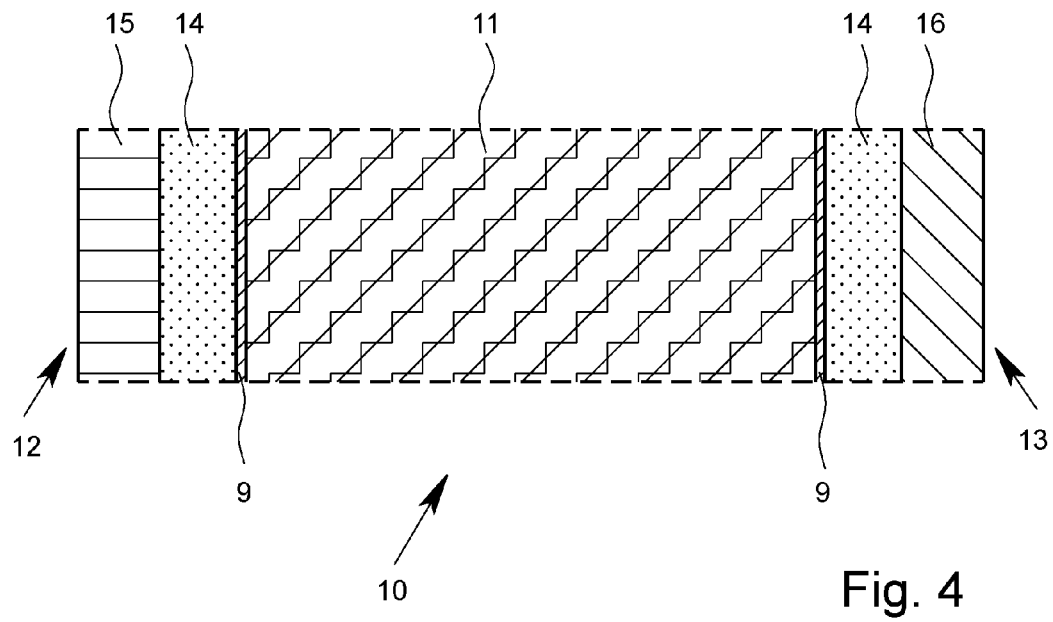
FIG. 4 is a schematic view of an insulated building structure, such as an insulated roof or wall structure, according to the present disclosure.

FIG. 4 schematically shows an insulated building structure 10, which can be an insulated roof and/or wall structure of a building. The building structure 10 has a thermal insulation layer 11. One film, as a protective layer 9, is arranged on an outer side 12 of the thermal insulation layer 11, and another is arranged on an inner side 13 of the thermal insulation layer 11 facing the building interior. Preferably, the same, or identically-constructed, protective layers 9 are arranged on both sides 12, 13 of the thermal insulation layer 11. Each protective layer 9 is made of a film or membrane having a water vapor diffusion equivalent air thickness $S_d$, at a relative humidity of the atmosphere surrounding the protective layer 9 in the range of less than 25%, of more than 10 m, preferably more than 20 m, and more preferably more than 30 m, and having, at a relative humidity of the atmosphere surrounding the protective layer 9 in the range of more than 90%, a water vapor diffusion equivalent air layer thickness $S_d$ of less than 0.4 m. In this way, the barrier values of the protective layer 9 are optimized in such a manner that they can be used both on the outer side 12 and on the inner side 13 of the thermal insulation layer 11. An air layer 14 contacts the protective layers 9 on each side 12, 13 of the thermal insulation layer 11. A cladding 15 for the outermost layer, which can be, in the case of a roof structure, a roofing made of tiles or the like. It should be understood that a corresponding construction can also be provided in an insulated building structure in which the outermost layer is a facade cladding made of stone, wood or another facade material. The innermost layer is formed by a cladding 16, which can be a gypsum plasterboard wall or another conventional internal cladding.

A building structure can in principle also have a layer sequence and/or layer thicknesses that deviates from the sequence of layers and the layer thicknesses shown in FIG. 4. Only the position of the protective layer 9 according to the invention directly on the outer and/or inner side of the insulation package is fixed.

LIST OF REFERENCE NUMBERS

1 Roof structure
2 Roof tile
3 Air layer
4 Vapor retarder
5a-c Glass wool layers
6 Vapor retarder
7 Air layer
8 Gypsum plasterboard
9 Protective layer
10 Building structure
11 Thermal insulation layer
12 Outer side
13 Inner side
14 Air layer
15 Cladding
16 Cladding

The invention claimed is:

1. An insulated building structure, having at least one thermal insulation layer, wherein at least one moisture-variable protective layer for the thermal insulation layer is provided on an outer side of the thermal insulation layer and also on an inner side of the thermal insulation layer facing a building interior of a building, wherein the moisture-variable protective layers each have a water vapor diffusion equivalent air layer thickness $S_d$ that depends on the ambient moisture, wherein the water vapor diffusion equivalent air layer thicknesses $S_d$ of both moisture-variable protective layers, in the range of a relative humidity between 0% and 25%, or in the range of a relative humidity between 80% and 100%, differ from each other by less than 20%, wherein an increase in the relative humidity of air surrounding each moisture-variable protective layer leads to a lowering of the $S_d$ value, and a decrease in the relative humidity of air surrounding each moisture-variable protective layer leads to an increase in the $S_d$ value.

2. The insulated building structure according to claim 1, wherein the water vapor diffusion equivalent air thicknesses $S_d$ of both of the moisture-variable protective layers, in the range of a relative humidity of 80% to 100%, differ from each other by less than 10%.

3. The insulated building structure according to claim 1, wherein, the moisture-variable protective layers are of identical design.

4. The insulated building structure according to claim 1, wherein the moisture-variable protective layers have the same $S_d$ values.

5. The insulated building structure according to claim 1, wherein the $S_d$ value, at a relative humidity of 25%, is between 20 m and 100 m, the $S_d$ value, at a relative humidity of 37.5%, is between 20 m and 90 m, the $S_d$ value, at a relative humidity of 65.5%, is between 4 m and 20 m, the $S_d$ value, at a relative humidity of 80%, is between 0.07 m and 0.1 m, and the $S_d$ value, at a relative humidity of 90%, is less than 0.09 m.

6. The insulated building structure according to claim 1, wherein the $S_d$ value at a relative humidity of 25% is between 10 m and 30 m, the $S_d$ value at a relative humidity of 37.5% is between 10 m and 30 m, but is less than at a relative humidity of 25%, the $S_d$ value at a relative humidity of 65.5% is between 5 m and 15 m, but is less than at a relative humidity of 37.5%, the $S_d$ value at a relative humidity of 80% is between 0.8 m and 5 m, and the $S_d$ value at a relative humidity of 90% is between 0.08 m and 0.12 m.

7. The insulated building structure according to claim 6, wherein the $S_d$ value at the relative humidity of 80% is between 1 m and 3 m, and the $S_d$ value at the relative humidity of 90% is less than 0.1 m.

8. The insulated building structure according to claim 1, wherein at least one protective layer comprises a material which, at a relative humidity of the atmosphere surrounding the moisture-variable protective layer of up to 25%, has a water vapor diffusion equivalent air layer thickness $S_d$ of greater than or equal to 10 m, and at a relative humidity of the atmosphere surrounding the moisture-variable protective layer of more than 90%, has a water vapor diffusion equivalent air layer thickness $S_d$ of less than 0.4 m.

9. The insulated building structure according to claim 8, wherein the material is designed as a flat structure, and formed as a film or a coating of a substrate material.

10. The insulated building structure according to claim 9, wherein the material is formed as a spray coating.

11. The insulated building structure according to claim 8, wherein the material comprises at least one of a polyamide, and a polyamide copolymer.

12. The insulated building structure according to claim 11, wherein the polyamide is PA 6 or PA 3.

13. The insulated building structure according to claim 8, wherein the material comprises an ionomer.

14. The insulated building structure according to claim 8, wherein the material is an ethylene vinyl alcohol homo- or copolymer.

15. The insulated building structure according to claim 8, wherein the material is a polyurethane.

16. The insulated building structure according to claim 8, wherein the material comprises an ethylene vinyl acetate.

17. The insulated building structure according to claim 8, wherein a change in the relative humidity of the atmosphere surrounding the moisture-variable protective layer leads to a delayed change in the water vapor diffusion equivalent air layer thickness $S_d$ of the material.

18. The insulated building structure according to claim 17, wherein an increase in the relative humidity leads to a lowering of the water vapor diffusion equivalent air layer thickness $S_d$ of the material after 2 h to 96 h.

19. The insulated building structure according to claim 1, wherein the $S_d$ value, at a relative humidity of 25%, is between 40 m and 90 m, the $S_d$ value at a relative humidity of 37.5% is between 30 m and 80 m, the $S_d$ value at a relative humidity of 65.5% is between 5 m and 15 m and the $S_d$ value at a relative humidity of 80% is less than 0.1 m.

20. An insulated building structure, having at least one thermal insulation layer, wherein at least one moisture-variable protective layer for the thermal insulation layer is provided on an outer side of the thermal insulation layer and also on an inner side of the thermal insulation layer facing a building interior of a building, wherein the moisture-variable protective layers each have a water vapor diffusion equivalent air layer thickness $S_d$ that depends on the ambient moisture, wherein the water vapor diffusion equivalent air layer thicknesses $S_d$ of both moisture-variable protective layers, in the range of a relative humidity between 0% and 25%, and/or in the range of a relative humidity between 80% and 100%, differ from each other by less than 20%,
wherein the $S_d$ value, at a relative humidity of 25%, is between 20 m and 100 m, the $S_d$ value, at a relative humidity of 37.5%, is between 20 m and 90 m, the $S_d$ value, at a relative humidity of 65.5%, is between 4 m and 20 m, the $S_d$ value, at a relative humidity of 80%, is between 0.07 m and 0.1 m, and the $S_d$ value, at a relative humidity of 90%, is less than 0.09 m.

21. An insulated building structure, having at least one thermal insulation layer, wherein at least one moisture-variable protective layer for the thermal insulation layer is provided on an outer side of the thermal insulation layer and also on an inner side of the thermal insulation layer facing a building interior of a building, wherein the moisture-variable protective layers each have a water vapor diffusion equivalent air layer thickness $S_d$ that depends on the ambient moisture, wherein the water vapor diffusion equivalent air layer thicknesses $S_d$ of both moisture-variable protective layers, in the range of a relative humidity between 0% and 25%, and/or in the range of a relative humidity between 80% and 100%, differ from each other by less than 20%,
wherein the $S_d$ value at a relative humidity of 25% is between 10 m and 30 m, the $S_d$ value at a relative humidity of 37.5% is between 10 m and 30 m, but is less than at a relative humidity of 25%, the $S_d$ value at a relative humidity of 65.5% is between 5 m and 15 m, but is less than at a relative humidity of 37.5%, the $S_d$ value at a relative humidity of 80% is between 0.8 m and 5 m, and the $S_d$ value at a relative humidity of 90% is between 0.08 m and 0.12 m.

22. An insulated building structure, having at least one thermal insulation layer, wherein at least one moisture-variable protective layer for the thermal insulation layer is provided on an outer side of the thermal insulation layer and also on an inner side of the thermal insulation layer facing a building interior of a building, wherein the moisture-variable protective layers each have a water vapor diffusion equivalent air layer thickness $S_d$ that depends on the ambient moisture, wherein the water vapor diffusion equivalent air layer thicknesses $S_d$ of both moisture-variable protective layers, in the range of a relative humidity between 0% and 25%, and/or in the range of a relative humidity between 80% and 100%, differ from each other by less than 20%, wherein at least one protective layer comprises a material which, at a relative humidity of the atmosphere surrounding the moisture-variable protective layer of up to 25%, has a water vapor diffusion equivalent air layer thickness $S_d$ of greater than or equal to 10 m, and at a relative humidity of the atmosphere surrounding the moisture-variable protective layer of more than 90%, has a water vapor diffusion equivalent air layer thickness $S_d$ of less than 0.4 m.

23. An insulated building structure, having at least one thermal insulation layer, wherein at least one moisture-variable protective layer for the thermal insulation layer is provided on an outer side of the thermal insulation layer and also on an inner side of the thermal insulation layer facing a building interior of a building, wherein the moisture-variable protective layers each have a water vapor diffusion equivalent air layer thickness $S_d$ that depends on the ambient moisture, wherein the water vapor diffusion equivalent air layer thicknesses $S_d$ of both moisture-variable protective layers, in the range of a relative humidity between 0% and 25%, and/or in the range of a relative humidity between 80% and 100%, differ from each other by less than 20%, wherein the $S_d$ value, at a relative humidity of 25%, is between 40 m and 90 m, the $S_d$ value at a relative humidity of 37.5% is between 30 m and 80 m, the $S_d$ value at a relative humidity of 65.5% is between 5 m and 15 m and the $S_d$ value at a relative humidity of 80% is less than 0.1 m.

* * * * *